United States Patent [19]

Kageyama et al.

[11] 4,149,142
[45] Apr. 10, 1979

[54] SIGNAL TRANSMISSION SYSTEM WITH AN ERROR CONTROL TECHNIQUE

[75] Inventors: Satoshi Kageyama; Keiji Takeuchi, both of Yokohama; Keisuke Ogi, Tokyo, all of Japan

[73] Assignee: Tokyo Shibaura Electric Co., Ltd., Kawasaki, Japan

[21] Appl. No.: 826,053

[22] Filed: Aug. 19, 1977

[30] Foreign Application Priority Data

Aug. 20, 1976 [JP] Japan .................. 51-99364

[51] Int. Cl.² ........................................ G08C 25/02
[52] U.S. Cl. ........................................ 340/146.1 BA
[58] Field of Search ............................. 340/146.1 BA

[56] References Cited

U.S. PATENT DOCUMENTS

| | | | |
|---|---|---|---|
| 3,641,494 | 2/1972 | Perrault et al. | 340/146.1 BA |
| 3,646,518 | 2/1972 | Weinstein | 340/146.1 BA |
| 3,671,945 | 6/1972 | Maggio, Jr. | 340/146.1 BA |
| 3,676,846 | 7/1972 | Busch | 340/146.1 BA |
| 3,893,072 | 7/1975 | D'Antonio et al. | 340/146.1 BA |
| 3,956,589 | 5/1976 | Weathers et al. | 340/146.1 BA |
| 3,979,719 | 9/1976 | Tooley et al. | 340/146.1 BA |

Primary Examiner—Charles E. Atkinson
Attorney, Agent, or Firm—Oblon, Fisher, Spivak, McClelland & Maier

[57] ABSTRACT

A signal transmission system embodying this invention which can control errors comprises a selective automatic repeat request (ARQ) system for controlling errors occurring in transmission of data on telephone data communication channels. With this selective ARQ system, an error-controlling signal conducted through a backward channel does not contain a check bit for detection or correction of errors, thereby preventing a time loss which might occur if a error-control signal was repeatedly issued between the transmission and receiving sides. The subject signal-transmitting apparatus is adapted to be used in a static image transmission having a large amount of data and has such a circuit arrangement as attains the efficient transmission of data and the display of an error-free image of good picture quality.

9 Claims, 16 Drawing Figures

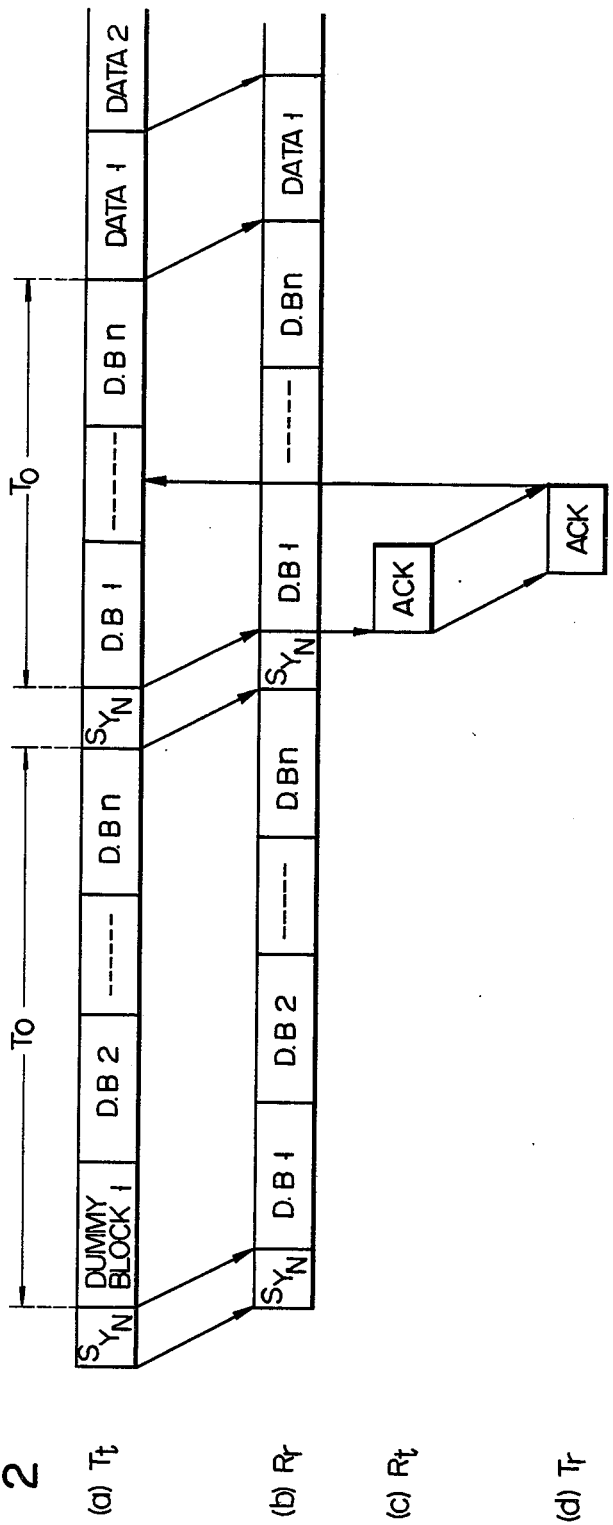
F I G. 2
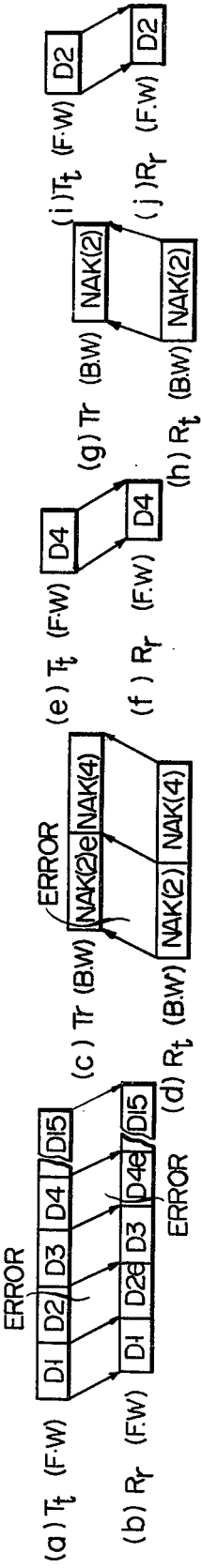
F I G. 11
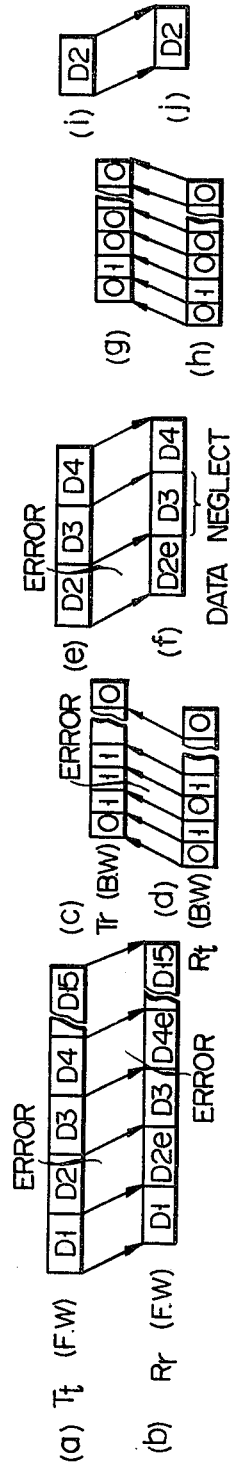
F I G. 13

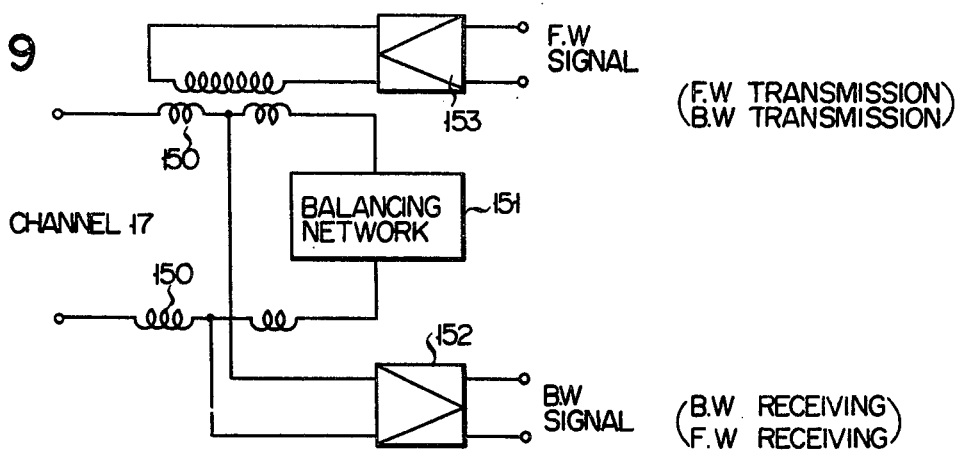
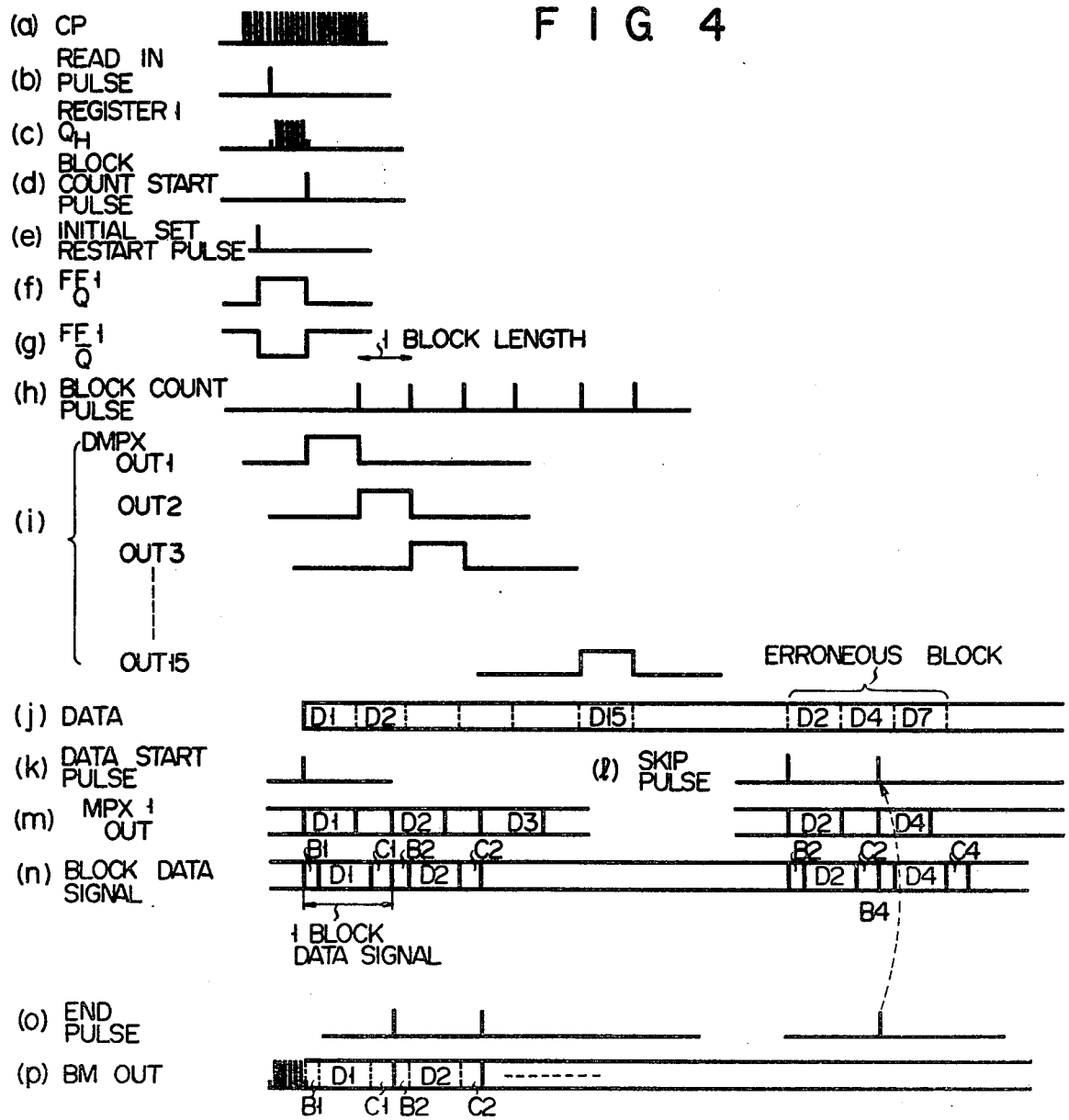

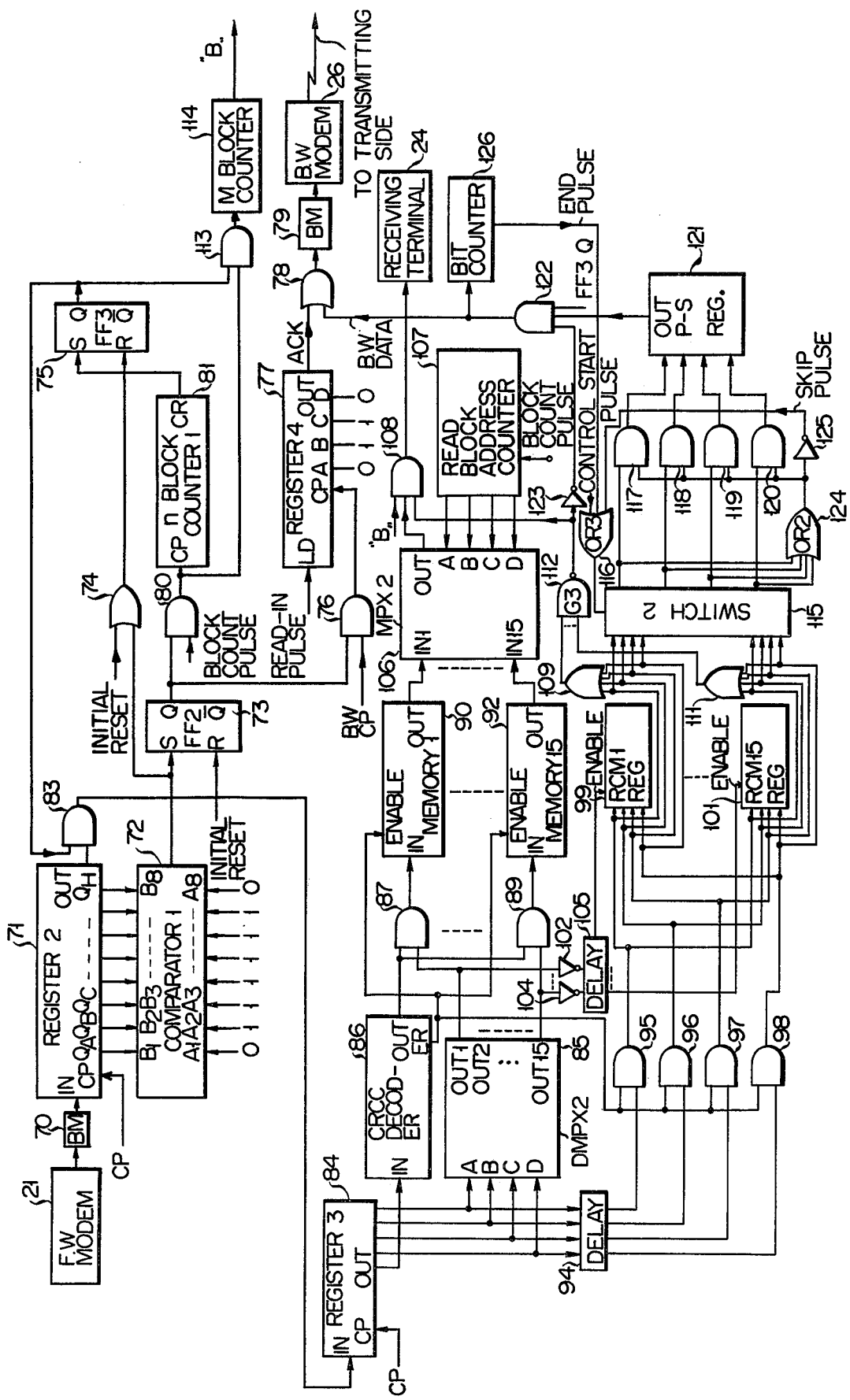
F I G. 5

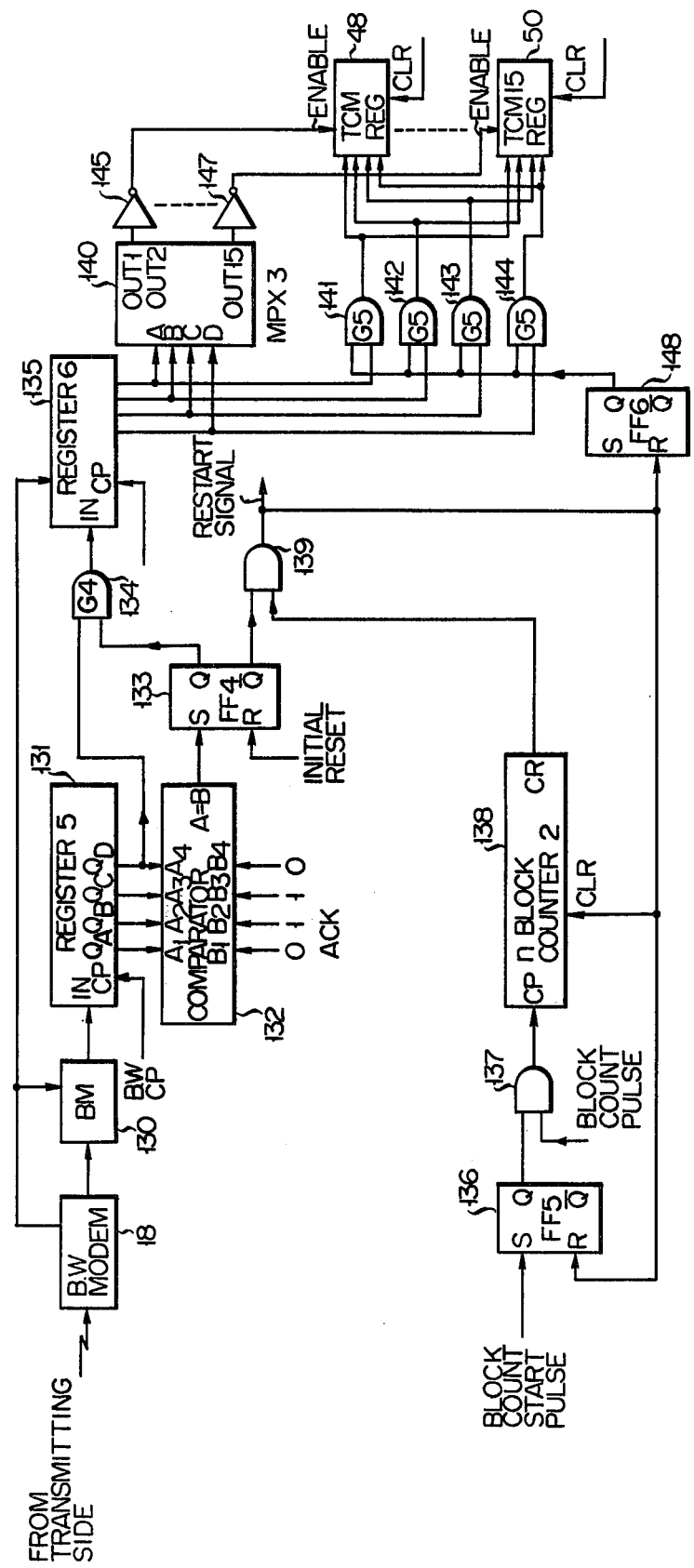
F I G. 7

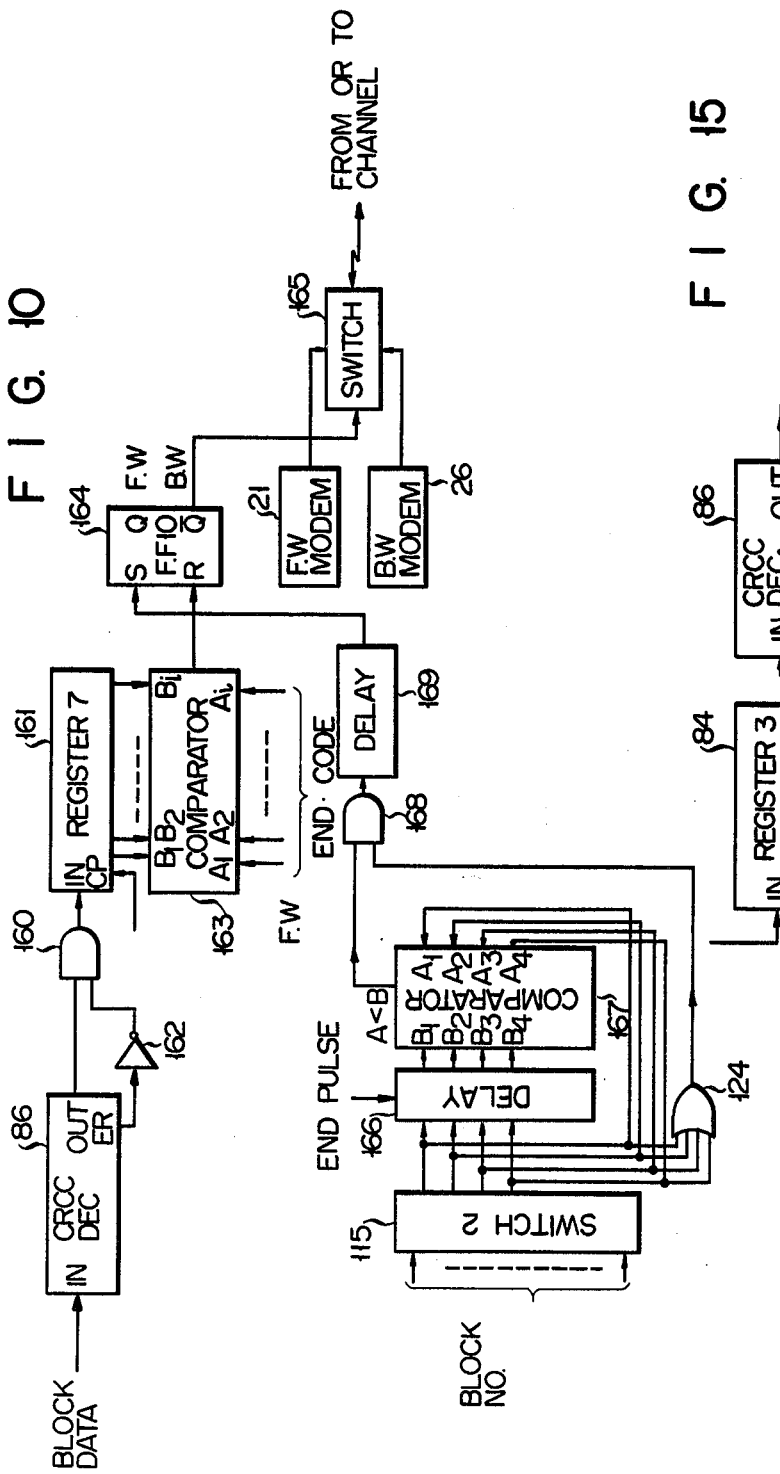
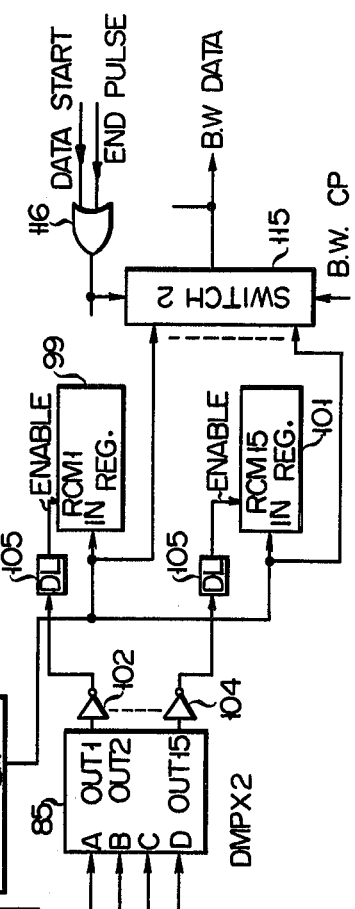
FIG. 10
FIG. 15

SIGNAL TRANSMISSION SYSTEM WITH AN ERROR CONTROL TECHNIQUE

BACKGROUND OF THE INVENTION

This invention relates to a signal-transmission system, and more particularly to a signal-transmission system capable of controlling errors for error-free transmission of static image signals.

Transmission of a static image by means of a telephone line system is expected to be realized in the near future because the existing telephone facilities are readily available for use. Particularly where transmission of a static image is undertaken through the telephone line system, there is the advantage of allowing said transmission to be carried out between any given localities only when so desired. For transmission of a static image of good picture quality through the telephone line system, however, it is necessary to apply digital transmission, shorten the time of transmission by using bit-reduction technique and applying high speed MODEM, and further suppress occurrence of errors resulting from the required high speed transmission of data signals with bit-reduction technique.

A static image transmission system includes a facsimile transmission system. This system carries out transmission of static images representing documents or bills between the transmitter and receiver through a transmission line. Application of, for example, a telephone line system for transmission of data signals of narrow frequency band enables the transmission area of an image to be more freely chosen over a broader range then when a private line is used for such transmission. However, application of the telephone line system has the drawback that random or burst errors are likely to arise in transmitted data due to appearance of noises on the transmission line or intrusion of noises thereinto from an external source. Known literature on such transmission errors and control thereof includes "Errors and error control" by H. O. Burton and D. D. Sullivan Proc. IEEE, vol. 60, No. 11, November, 1972. Further, an automatic repeat request (ARQ) system is already known as a signal transmission system capable of controlling errors. This ARQ system is set forth in "ARQ Error Control on the Satellite Channel" by A. G. Gatfield, IEEE International Communications Conf., 1974, pp. 22B-1 to 22B-5. This literature describes three types of the ARQ system, that is, "Stop and Wait ARQ", "Continuous ARQ" and "Selective Repeat ARQ" and the respective transmission efficiencies. It will be seen from this literature that the "Selective Repeat ARQ" system has the highest transmission efficiency. This "Selective Repeat ARQ" system is detailed in "A Selective Repeat ARQ System" by A. G. Gatfield and T. R. Dobyns, COMSAT Laboratories, IEEE, 1974 NTC, pp. 189 to 195. However, application of the "Selective Repeat ARQ" error control system for transmission of a static image would make it necessary not only to install a memory device having a sufficiently large capacity to handle an amount of data being transmitted between the transmitter and receiver, but also additionally to provide means for replacing (that is edit function means) previously supplied erroneous data by fresh error-free data. For this reason, the "Selective Repeat ARQ" error control system presents considerable difficulties in being applied for facsimile transmission of data through a telephone line system and consequently has not yet been put to practical use.

Where, with the "Selective Repeat ARQ" system, data transmission is controlled by dividing a transmission line into two different channels, that is, where a forward channel is used for data transmission, and a backward channel is used for data error control, then a data block is first sent forth through the forward channel from the transmitter to the receiver. In this case, the receiver issues an acknowledgement (ACK) control signal if data received is correct, and a negative acknowledgement (NAK) control signal if data received is erroneous, both through the backward channel. Where an error arises in either of the aforesaid control signals (ACK and NAK) during transit through the backward channel, then the transmitter supplies the receiver through the forward channel with an enquiry (ENQ) signal demanding retransmission of a control signal. At this time, the receiver again sends forth the control signal to the transmitter through the backward channel. Where the transmitter receives the retransmitted control signal in an error-free state, then the transmitter undertakes the succeeding data transmission, if the control signal is of the ACK type. If the control data is of the NAK type, then the transmitter supplies the receiver with a fresh error-free data block corresponding to the previously transmitted erroneous data block. Therefore, a check bit such as an error detection bit or error correction bit must be attached to an error control signal issued from the receiver to the transmitter through the backward channel. This eventually increases a total transmitted amount of control signals, causing completion of transmission of correct data to consume a great deal of time with the resultant decline in transmission efficiency.

SUMMARY OF THE INVENTION

The primary object of this invention is to provide a signal transmission system which eliminates occurrence of errors during transit of a data signal, thereby providing an image of good picture quality.

Another object of the invention is to provide a signal transmission system which enables data signals to be transmitted with a higher efficiency than has been possible in the past.

According to an aspect of the invention, there is provided a signal transmission system capable of controlling errors which comprises a transmission section including first memory means for storing data being transmitted in the form having the prescribed block length measured by a number of bits, control means for selecting a data block having the prescribed serial number from among those which are stored in the memory means, and means for attaching the prescribed check code to the selected data block; and a receiving section including receiving means for receiving a data block sent forth from the transmission section, detection means for detecting an error in a data block received by the receiving means, second memory means for successively storing only error-free correct data blocks included in the received data blocks, and means for issuing an error control signal indicating a demand for transmission of a fresh error-free data block corresponding to the previously transmitted data block whose error was detected by the detection means, and wherein the transmission section transmits a fresh error-free data block corresponding to an error control signal received from the receiving section, without the necessity of determining whether the control signal thus received erroneous or not.

The signal transmission system of this invention not only transmits a static image of a good picture quality by means of the "Select Repeat ARQ" system but also controls transmission of erroneous data without the necessitive of attaching an error detection check bit to a control signal transmitted by the receiving section through the backward channel.

Other features and advantages of this invention will be apparent from the following description when taken in connection with the appended drawings.

BRIEF DESCRIPTION OF THE DRAWINGS

FIG. 2 is a time chart illustrating the block-synchronizing operation undertaken at commencement of data transmission by the signal transmission system of the invention;

FIG. 4 is a time chart illustrating the operation of the circuit arrangement of FIG. 3;

FIG. 5 shows a detailed circuit arrangement of the receiving side (formed of the forward receiving section $R_r$ and backward transmission section $R_t$) shown in FIG. 1;

FIG. 7 presents a detailed circuit arrangement of the receiving section $T_r$ of the transmission side (backward receiving section);

FIG. 9 is a detailed block circuit diagram associated with frequency division undertaken by the separation circuit of FIG. 1;

FIG. 10 is a detailed block circuit diagram associated with time division carried out by the separation circuit of FIG. 1;

FIG. 11 is a time chart illustrating the operation of the signal transmission system of FIG. 1;

FIG. 13 is a time chart illustrating transmission of a pattern control signal carried out by a signal transmission system according to another embodiment of the invention;

FIG. 15 presents the arrangement of that circuit included in the receiving side of FIG. 5 which has been modified for transmission of the pattern control signal effected by said another embodiment.

DETAILED DESCRIPTION OF THE PREFERRED EMBODIMENTS

Figure 1:
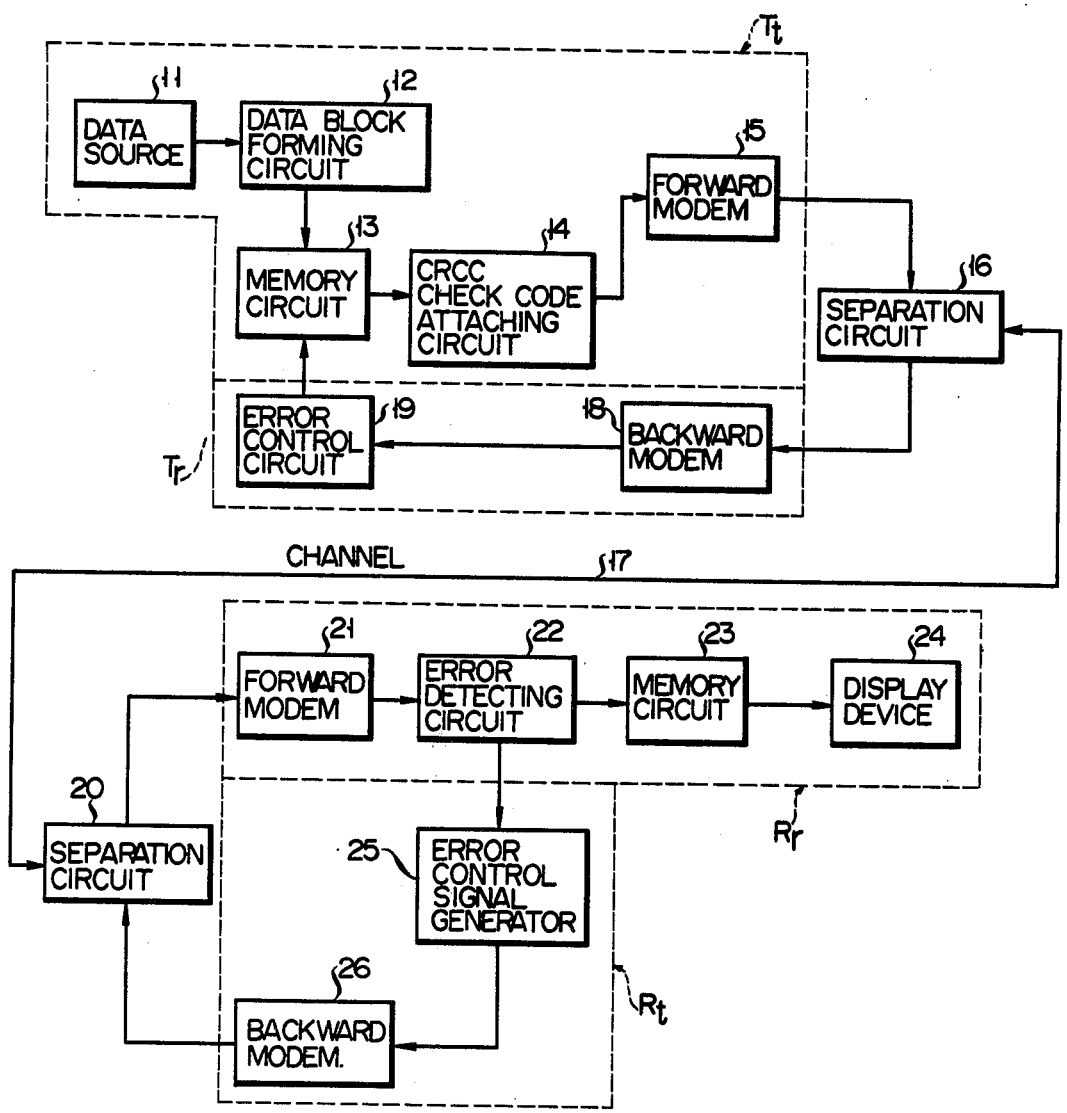
FIG. 1 is a schematic block circuit diagram of a signal transmission system according to one embodiment of this invention.

FIG. 1 is a block circuit diagram of a signal transmission system according to one embodiment of this invention. There will now be described the transmission section (forward transmission section) $T_t$ and receiving section (backward receiving section) $T_r$ of the transmission side. A data source 11 is that of, for example, image signals being transmitted. A data block-forming circuit 12 divides data signals delivered from the data source 11 into data blocks each having a prescribed bit length formed of, for example, 512 bits. This data block-forming circuit 12 divides signals representing an image impressed on a single sheet of manuscript into, for example, fifteen data blocks. A memory circuit 13 is a random access memory (RAM) for successively storing data blocks. A check code-attaching circuit 14 attaches an error detection check code (CRCC) of, for example, sixteen bits to a data block read out of the memory circuit 13.

A forward MODEM15 modulates a data block signal sent forth from the check code-attaching circuit 14. A separation circuit 16 carries out the time division or frequency division of the modulated data block signal. An output signal from the separation circuit 16 is transmitted to the receiving side through a common transmission channel 17 (in this case acting as a forward channel).

The separation circuit 16 carries out the later described frequency division or time division of a control signal (ACK or NAK signal) supplied from the receiving side through the common transmission channel 17 (now acting as a backward channel). A backward MODEM18 demodulates the control signal (ACK or NAK) issued from the separation circuit 16. The "Selective Repeat ARQ" system first transmits all data blocks, regardless of whether errors may or may not arise during transmission of the data blocks and then supplies only a fresh error-free data block corresponding to that which presented an error during transmission.

When acting as a backward channel for transmitting the serial number of a data block in which an error occurred during transmission, the common transmission channel 17 may be permanently designed for time division or frequency division. With the signal transmission system of this invention, the transmission side makes no response to an ACK control signal received from the receiving side through the backward channel, whether the transmission channel 17 is designed for time division or frequency division, and supplies the receiving side only with a fresh error-free data block corresponding to the serial data block number represented by a NAK control signal sent forth from the receiving side.

An error control circuit 19 is supplied with a control signal delivered from the backward MODEM18. Where the transmission side makes no response to the control signal (that is, an ACK signal), then the error control circuit 19 allows the succeeding data block to be transmitted to the receiving side. Where the control signal denotes a serial data block number, then the error control circuit 19 causes a fresh error-free data block corresponding to said data block number to be delivered to the receiving side. Namely, the error control circuit 19 specifies a data block to be read next time out of the memory circuit 13.

There will now be described the receiving section (forward receiving section) $R_r$ and transmitting section (backward transmitting section) $R_t$ of the receiving side. A separation circuit 20 has the same arrangement and function as the first-mentioned separation circuit 16. As later described, the receiver's separation circuit 20 may be designed for time division or frequency division. A forward MODEM21 demodulates a data block supplied from the transmission side through the common transmission channel 17 acting as a forward channel and separation circuit 20. An error detection circuit 22 determines whether a data block sent forth from the transmission side has an error.

A receiver's memory circuit 23 is of the RAM type like the transmitter's memory circuit 13. The memory circuit 23 is stored with a data block which has been determined to be error-free by the error detection circuit 22. A display device 24 is a terminal device of the subject signal transmission system for indicating data blocks stored in the memory circuit 23 in the form of characters or pictorial patterns.

A data block issued from the transmission side whose error has been detected by the error detection circuit 22 is not stored in the memory circuit 23. An error control signal generator 25 produces an acknowledgement control signal (ACK) when a data block delivered from the transmission side to the receiving side proves error-free, and a negative acknowledgement control signal (NAK) and the serial number of said erroneous data block, when the data block thus received is found erroneous. A backward MODEM26 demodulates a control signal supplied from the error control signal generator 25. The control signal (ACK or NAK) is sent from the receiving side to the transmission side through the separation circuit 20 and the common transmission channel 17 now acting as a backward channel in turn.

The signal transmission system of this invention is adapted for still picture transmission of static data. Based on the generally estimated maximum number of manuscript sheets, being transmitted during one transmission cycle static data handled by a still picture transmission system generally has as large an amount as about one million bits. In this case, establishment of a data block-synchronizing method before commencement of transfer of data blocks between the transmitter and receiver, followed by transmission of data blocks each having a prescribed bit number attains a higher transmission efficiency than the process of undertaking synchronization, each time a data block is transmitted. Obviously, bit synchronization is already established, starting with commencement of transmission when a telephone line system between the transmitter and receiver is set for transmission of data blocks. As seen from the time chart of FIG. 2, therefore, the signal transmission system of this invention is so designed that data block synchronization is established between the transmitter and receiver before data blocks are transmitted. The transmission section $T_t$ of the transmission side sends forth a data block synchronization code SYN and plurality of dummy data blocks DB's shown in FIG. 2(a) to the receiving side through the transmission channel as illustrated in FIG. 2(b). When the receiving section $R_r$ of the receiving side detects the data block synchronization code SYN, then the transmitting section $R_t$ of the receiving side issues, as indicated in FIG. 2(c), an ACK control signal to the transmission side through a backward channel, if a data block received is found error-free. When the receiving section $T_r$ of the transmission side detects said ACK control signal as shown in FIG. 2(d), then the transmission side issues data blocks DATA1 to DATAn is succession to the receiving side, starting with the end of the prescribed period of time $T_o$ after issue of the data block synchronization code SYN. When not detecting the data block synchronization code SYN, the receiving side gives no response to the transmission side. In this case, the transmission section $T_t$ of the transmission side again issues a data block synchronization code SYN to the receiving side at the end of the prescribed period of time $T_o$, thereby establishing transmission synchronization between both sides. Description is not given of a control circuit for establishing the data block synchronization, because said control circuit is not related to the object of this invention.

Figure 3:
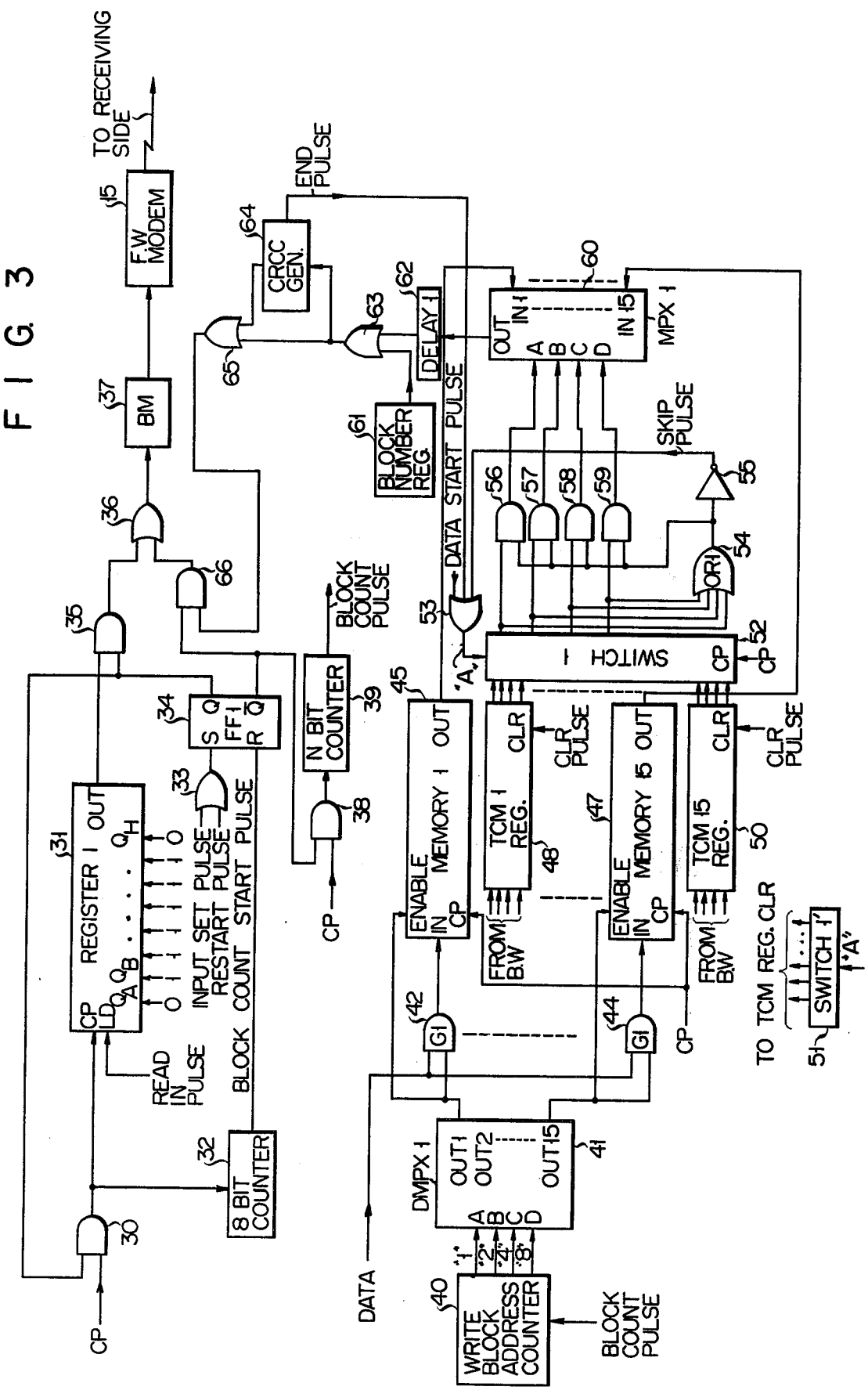
FIG. 3 indicates a detailed circuit arrangement of the transmission section $T_t$ of the transmission side (forward transmission section) shown in FIG. 1.

FIG. 3 shows the detailed circuit arrangement of the formed transmission section $T_t$ of the signal transmission system of FIG. 1. There will now be described by reference to the time chart of FIG. 4 the operation of the circuit arrangement of FIG. 3. Now let it be assumed that referential clock pulses CP (FIG. 4(a)) are issued from the control circuit (not shown) of the subject signal transmission system. The referential clock pulse CP is conducted to a register 31 and an 8-bit counter 32 through an AND gate 30. In this case, data block synchronization should be established, as previously mentioned, before data blocks are delivered from the transmission side to the receiving side. To this end, the control circuit issues a read-in pulse (FIG. 4(b)) to the register 31. The prescribed data block synchronization code SYN stored in the register 31 is chosen to be formed of, for example, eight bits as 01111110. An input set pulse or restart pulse (FIG. 4(e)) issued from the control circuit sets a flip-flop circuit 34, as shown in FIG. 4(f), through an OR circuit 33. An output signal from the set output terminal Q of the flip-flop circuit 34 which has a logic level of "1" is conducted to AND gates 30, 35. Therefore, the register 31 is supplied, as shown in FIG. 4(c), with the bits of the prescribed data block synchronization code SYN in succession, starting with the point of time at which said register 31 receives a read-in pulse.

The data block synchronization code SYN is stored in a buffer memory 37 through the AND gate 35 and OR gate 36, and further delivered to the receiving side after modulated by the forward MODEM15. A counter 32 issues one block count pulse, each time the counter 32 counts the same number of clock pulses as the eight bits constituting the data block synchronization code SYN, thereby resetting the flip-flop circuit 34 as shown in FIG. 4(f). Since, at this time, an output signal from the set output terminal Q of the flip-flop circuit 34 has a logic level of "0", transmission of the data block synchronization code SYN stops. Therefore, the signal transmission system commences transmission of data blocks.

At the same time as the above-mentioned operation, clock pulses are also counted by an N-bit counter 39 through an AND gate 38. This N-bit counter 39 sends forth block count pulses (FIG. 4(h)) each denoting one data block formed of an N number of bits, for example, 512 bits. With the foregoing embodiment, the whole data impressed on a single sheet of manuscript is transmitted in the form divided into fifteen data blocks as shown in FIG. 4(j). A counter 40 for counting the number of a specified memory address in which a data block is to be written (hereinafter simply referred to as "a write block address counter") specifies the numbers of the memory addresses which correspond to the serial numbers of the respective data blocks upon receipt of a block count pulse from the N-bit counter 39. A digital multiplexer (abbreviated as "DMPX2") 41 generates output signals OUT1 to OUT15 corresponding to the serial numbers of data blocks as shown in FIG. 4(i). The output signals are supplied to the gate circuits (G1) 42–44 and memories (MEMORY1 to MEMORY15) 45–47, all corresponding to the serial numbers of the data blocks. Where each of the memories 45–47 has its enable terminal supplied with a data signal having a logic level of "1", then the memory is rendered ready to store the data signal. Where a data signal having a logic level of 37 0" is brought to the enable terminal, then the memory is prevented from storing the data signal. Thus, the original data of a manuscript being sent forth from the transmitter to the receiver is conducted in the form of data blocks through the gate circuits (G1) 42–44 to the memories (MEMORY1 to MEMORY15) 45–47 corresponding to the specified serial numbers of data blocks. The respective memories (MEMORY1 to MEMORY15) are stored with essential data blocks each having an N number of (for example, 512) bits. TCM registers (TCM1 to TCM15) 48–50 provided to correspond to the respective memories (MEMORY1 to MEMORY15) 45–47 are stored with the serial numbers of erroneous data blocks. If the data blocks are found error-free, then the TCM registers 48–50 are cleared of the contents by a clear pulse CLR. However, in the initial condition of the subject signal transmission system, where transmission of data is commenced, the TCM registers 48–50 are stored with the serial numbers of all data blocks on the assumption that said data blocks are erroneous. The TCM registers 48–50 have the contents successively emptied by a clear signal issued from a switch circuit actuated by the later described signal "A", according as the data blocks are transmitted one after another. It will be noted that the gate circuits 42–44, memories 45–47 and TCM registers 48–50 respectively have the same function and provided in a number of fifteen to correspond to the fifteen output terminals OUT1–OUT15 of the digital multiplexer (abbreviated as "DMPX1") 41.

Where the forward and backward channels are designed for frequency division, then the receiving side sends back the serial number of an erroneous data block to the transmission side together with an NAK control signal through the backward channel. At this time, the contents of TCM registers (TCM1 to TCM15) 48–50 are changed through the process illustrated in FIG. 4, causing an error control signal specifying the serial number of an erroneous data block to be written in the corresponding unit of the TCM registers (TCM1 to TCM15) 48 to 50. The serial numbers of erroneous data blocks stored in parallel in the TCM registers (TCM1 to TCM15) 48 to 50 are conducted to a switch 52, where the transmission of said serial numbers are controlled by an output signal "A" from an OR circuit 53. The OR circuit 53 is already supplied with a data start pulse, end pulse and skip pulse. The data start pulse is the one issued from the control circuit at the end of the prescribed period of time $T_0$ after data block synchronization is established between the transmission side and receiving side. This data start pulse instructs commencement of data block transmission, as shown in FIG. 4(k). The end pulse is issued, as shown in FIG. 4(n), after one data block is transmitted in the form provided with a serial block number and a check code CRCC. The skip pulse is produced, as shown in FIG. 4(l), when a control operation is undertaken regarding the transmission of a fresh error-free data block corresponding to the previously transmitted erroneous data block, and has a function of omitting the retransmission of the succeeding error-free data blocks already supplied to the receiver in order to effect the smooth continuous transmission of data blocks in the serial order.

As previously described, with the "Selective Repeat ARQ" system, all data blocks D1 to D15 are first transmitted to the receiving side, and next fresh error-free data blocks corresponding to the data blocks in which an error occurred during the first step transmission are supplied to the receiving side. To this end, the OR circuit 54 examines the contents of the TCM registers (TCM1 to TCM15) 48–50 which are brought to said OR circuit 54 through the switch circuit 52. If the OR circuit 54 issues an output signal having a logic level of "1" as the result of said examination, then if means that it is necessary to transmit a fresh error-free data block corresponding to the contents (the serial number of an erroneous data block) of any of the TCM registers (TCM1 to TCM15) 48–50 in which at least one of the four bits constituting said serial number has a logic level of "1". If the OR circuit 54 issues an output signal having a logic level of "0", then it means that a data block represented by said serial data block number has already been transmitted to the receiver in an error-free state, making it necessary to retransmit said data block. Where, therefore, an output from the OR circuit 54 has a logic level of "0", then an inverter 55 sends forth a skip pulse (FIG. 4(l)), causing transmission to be shifted to the immediately following data block. Where the OR circuit 54 issues an output signal having a logic level of "1", the serial number of the data block delivered from the switch circuit 52 is conducted to a multiplexer 60 through one or more of AND circuits 56–59. The multiplexer 60 causes a data block corresponding to the specified serial number to be read out of the selected one of the memories MEMORY1 to MEMORY15 as shown in FIG. 4(m).

A data block number register 61 generates the serial number a data block being transmitted. A data block delivered from the multiplexer 60 is delayed by four bits constituting its serial number by a data block delay circuit 62, causing the serial number to be attached to the forward side of the data block. A check bit code CRCC is attached by a check code generator 64 to an assembly of the data block and its serial number which have passed through an OR circuit 63. Therefore, an OR circuit 65 produces a fully assembled data block signal shown in FIG. 4(n) which is formed of the data block, its serial number and check bit code CRCC. This data block signal is stored in a buffer memory BM37 through an AND circuit 66 and OR circuit 36. An end pulse is produced as shown in FIG. 4(o), each time one data block signal is fully assembled. At the issue of said end pulse, preparatory operations are carried out for formation of the succeeding data block signal. A data block signal (FIG. 4(n)) stored in the buffer memory BM37 (FIG. 4(p)) is read out at the prescribed speed, and sent forth to the transmission channel through the forward MODEM15 and separation circuit 16.

Figure 6:
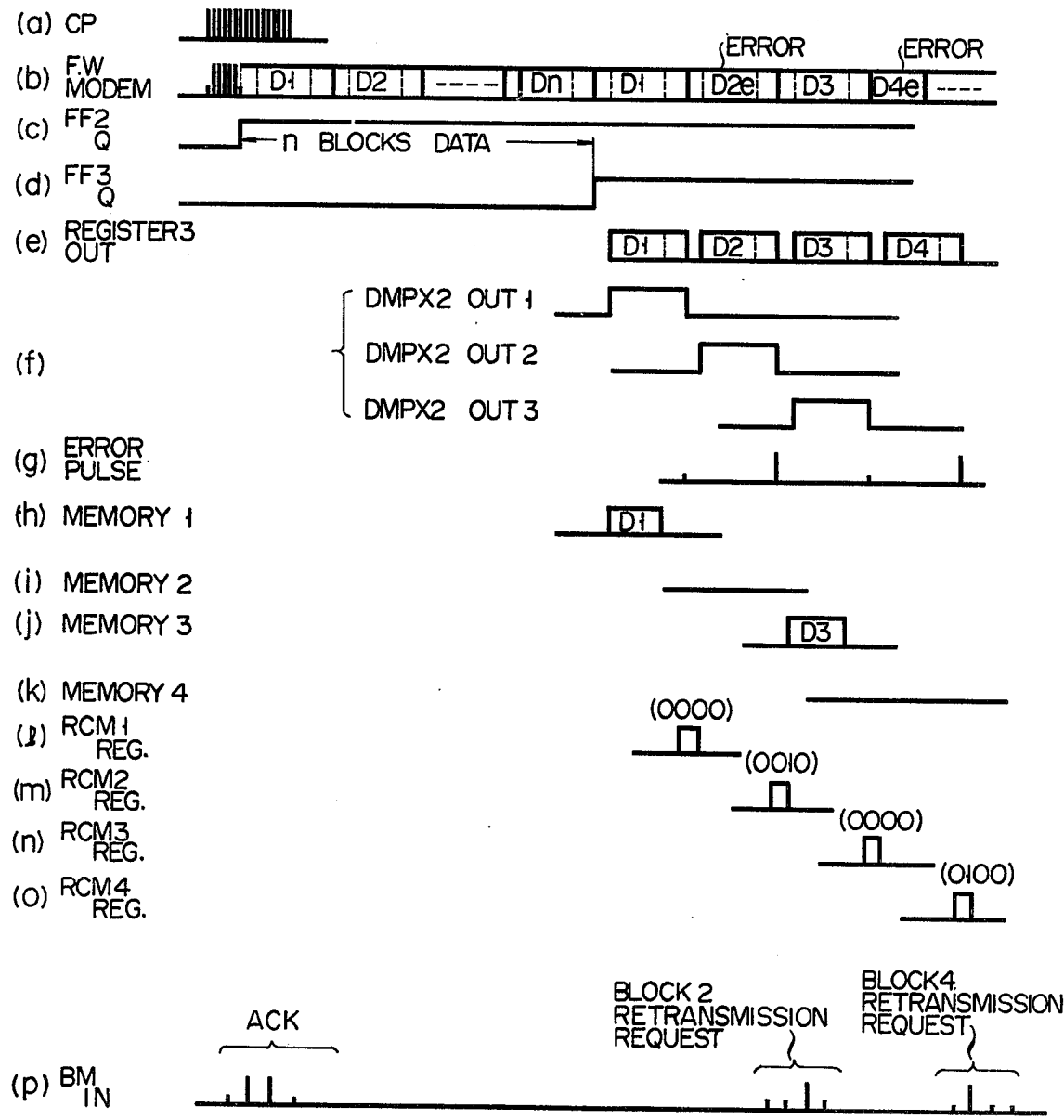
FIG. 6 is a time chart illustrating the operation of the circuit arrangement of FIG. 5.

FIG. 5 shows the detailed circuit arrangement of the forward receiving section $R_r$ and backward transmission section $R_t$ of the signal transmission system of FIG. 1. There will now be described the operation of said circuit arrangement by reference to the time chart of FIG. 6. A data block is transmitted from the transmission side to the receiving side through the forward channel. A data block signal (FIG. 6(b)) formed of a serial number, data block and check bit code is modulated by a forward MODEM21 and stored in a buffer memory BM70, and then conducted to a register 71 by clock pulses (FIG. 6(a)). However, data block synchronization should be established before the signal transmission system is loaded with a data block signal. To this end, the contents of the register 71 is compared by a comparator 72 with a data block synchronization code SYN formed of eight bits as "01111110". Where both bit arrangements coincide as the result of comparison, then the comparator 72 issues a set pulse. This set pulse sets a flip-flop circuit (FF2) 73 as shown in FIG. 6(c), causing a flip-flop circuit (FF3) 75 to be reset through an OR circuit 74. Where an output from the set output terminal Q of the flip-flop circuit (FF2) 73 is supplied to a register 77 through an AND circuit 76, then the aforesaid read-in pulse is stored in said register 77. Accordingly, an acknowledgement (ACK) signal (FIG. 6(p)) formed of 4 bits as "0110" is modulated by a backward MODEM26 through an OR circuit 78, and buffer memory 79 and then carried to the transmitter. An N data block counter 81 generates one count pulse, each time the counter 81 counts an N number of data blocks by data block count pulses conducted through an AND circuit 80 after detection of the data block synchronization code SYN. An output count pulse from the N data block counter 81 sets the flip-flop circuit (FF3) 75 as shown in FIG. 6(d). The aforesaid N number of data blocks immediately following the data block synchronization code SYN are dummy data blocks as seen from the time chart of FIG. 2. After these dummy data blocks are counted, substantial data blocks are stored in the memory device. While said N number of dummy data blocks are received, it is unnecessary to undertake error control. The value of N is determined according to, for example, the forward transmission speed, the bit number of each data block and the channel transmission time.

Where the data block synchronization code SYN is not detected in a train of bits immediately following the dummy data blocks, then data restored in the register 71 through the buffer memory 70 is supplied to a register 84 through an AND circuit 83. Where a serial block number is put, as shown in FIG. 4(p), in the reader section of a data block signal, then the an assembly of the data block and check code are read out in bit serial, as shown in FIG. 6(e), from a register 84. The serial block number of the data block read out in bit parallel of the register 84 is conducted to a digital multiplexer (DMPX2) 85. As the result, that of the output terminals OUT1 to OUT15 of the digital multiplexer (DMPX2) 85 which corresponds to an input data block number issues a pulse (FIG. 6(f)) only during the time width of the assembly of the data block and check code represented by said data block number. The aforesaid assembly of a data block and check code is supplied to an error detection code (CRCC) decoder 85 to be subjected to an error check. If the data block has an error, then the ER terminal of the decoder 86 generates an error pulse (FIG. 6(g)). On the other hand, an error-free data block which has passed through the decoder 86 is stored in any of the memories (MEMORY1 to MEMORY15) 90-92 through the corresponding one of the AND circuits 87 to 89 which are supplied with output signals (OUT1 to OUT15) corresponding to the respective data blocks from the digital multiplexer (DMPX2) 85.

Now let it be assumed that an error is detected in data blocks D2$_e$, D4$_e$ as shown in FIG. 6(b). Then an error pulse (FIG. 6(g)) is issued at the end of the erroneous data blocks D2$_e$, D4$_e$ respectively. Therefore, these erroneous data blocks D2$_e$, D4$_e$ are not stored in the corresponding memories MEMORY2, MEMORY4 as shown in FIGS. 6(i) and 6(k). On the other hand, error-free data blocks D1, D3 are stored in the corresponding memories MEMORY1, MEMORY3. Namely, an erroneous data block is prevented from being stored in a memory by the enable circuit thereof which is supplied with an error pulse. The serial number of the erroneous data block has to be stored in a memory to meet the subsequent receiver's demand for the transmission side to send forth a fresh error-free data block corresponding to said erroneous data block. Therefore, the serial numbers of erroneous data blocks read out of the register 84 are delivered to AND circuits 95-98 through a delay circuit 94 to the written in the corresponding erroneous data block number registers (RCM1 to RCM15) 99-101 upon receipt of an error pulse from the error detection code (CRCC) decoder 86. This writing operation is undertaken while the output terminals OUT1 to OUT15 of the digital multiplexer (DMPX2) 85 are connected to the enable terminals of the corresponding erroneous data block number registers (RCM1 to RCM15) 99-101 through inverters 102-104 and a delay circuit 105. Since the data blocks D1, D3 are error-free as previously described, code bits constituting the serial block numbers of these error-free data blocks D1, D3 are stored in the registers (RCM1 to RCM15) 99-101 in the form of "0000" as illustrated in FIGS. 6(l) and 6(n). Since the data blocks D2$_e$, D4$_e$ are erroneous, code bits constituting the serial numbers of those erroneous data blocks D2$_e$, D4$_e$ are stored in the registers RCM2, RCM4 in the form of "0010" and "0100" respectively as indicated in FIGS. 6(m) and 6(o). Code bits initially stored in the registers (RCM1 to RCM15) 99-101 are all set in the form of "0000".

Output signals from the memories (MEMORY1 to MEMORY15) 90-92 are delivered to a multiplexer (MPX2) 106. At this time, data blocks being transmitted are specified according to the contents of read block address counter which carries out successive counting by data block count pulses. The specified data blocks are sent forth through an AND circuit 108 to the display device 24 provided in the receiver's terminal section. The display device 24 indicates data received. Where all outputs from OR circuits 109-111 corresponding to the registers (RCM1 to RCM15) 99-101 have a logic level of "0", namely, where the code bits stored in said registers are all indicated in the form of "0000" (that is, under the condition in which data blocks received are all error-free), then these error-free data blocks are supplied to the display device 24. To this end, the output terminal of an NAND gate circuit 112 supplied with output signals from the OR circuits 109-111 is connected to one of the input terminals of the AND gate 108. Where even one of the code bits stored in any of the registers (RCM1 to RCM15) 99-101 is denoted by a logic level of "1", then, the NAND gate circuit 112 generates an output signal having a logic level of "0", preventing the contents of the memories (MEMORY1 to MEMORY15) 90-92 from being read out. To distinguish between the initial state of establishing data block synchronization and the subsequent state of transmitting substantial data blocks to the receiver, an M block counter 114 counts data block count pulses conducted through an AND circuit 113. When counting a total number M (for example, fifteen) of substantial data blocks, the M block counter 114 generates an output signal "B". If this output signal "B" is always supplied to one of the input terminals of the AND circuit 108, then the contents of the memories (MEMORY1 to MEMORY15) 90-92 are delivered to the display device 24 provided in the receiver's terminal section.

A switch (SWITCH2) 115 is a circuit for sending forth an error control signal (that is, the serial number of an erroneous data block). This switch (SWITCH2) 115 commences operation after receiving more than one data blocks including erroneous ones by a control start pulse conducted through an OR gate (OR3) 116.

The serial number of an erroneous data block stored in the registers (RCM1 to RCM15) 99-101 is sent forth to a parallel-serial register 121 through the switch (SWITCH2) 115 and AND circuits 117-120. In the parallel-serial register 121, the serial number of an erroneous data block is changed from the parallel to the serial form. An output signal from the parallel-serial register 121 forms a backward data BW DATA after passing through an AND circuit 122. This backward data BW DATA (retransmission request) is stored in the buffer memory 79 through the OR circuit 78 (FIG. 6(p)), and then delivered to the transmission side through the backward MODEM26 as an error control signal denoting the receiver's demand for the transmission side to issue a fresh error-free data block corresponding to the previously transmitted erroneous data block. If an OR circuit (OR2) 124 generates an output signal having a logical level of "0", then it means that a data block has been received in an error-free state. Therefore, the "0" output signal from the OR circuit (OR2) 124 has its logic level reversed from "0" to "1" by an inverter 125 to be used as a skip pulse. This skip pulse is conducted to the switch (SWITCH2) 115 through the OR circuit 116, this rendering the switch (SWITCH2) 115 ready for selection of the serial block number of a data block being transmitted next time.

The signal transmission system of this invention further comprises a BIT counter 126 for counting a number of (for example 512) bits constituting a data block received. When counting the prescribed number of bits, the BIT counter 126 issues an end pulse END PULSE, which in turn is supplied to the switch (SWITCH2) 115 through the OR circuit 116. The switch (SWITCH2) 115 judges whether a data block represented by the succeeding serial block number is erroneous. If the data block is found erroneous, the corresponding serial block number is converted into a serial form and sent forth to the transmission side as an error control signal denoting the receiver's demand for the transmitter to supply a fresh error-free data block corresponding to the previously transmitted erroneous data block.

Figure 8:
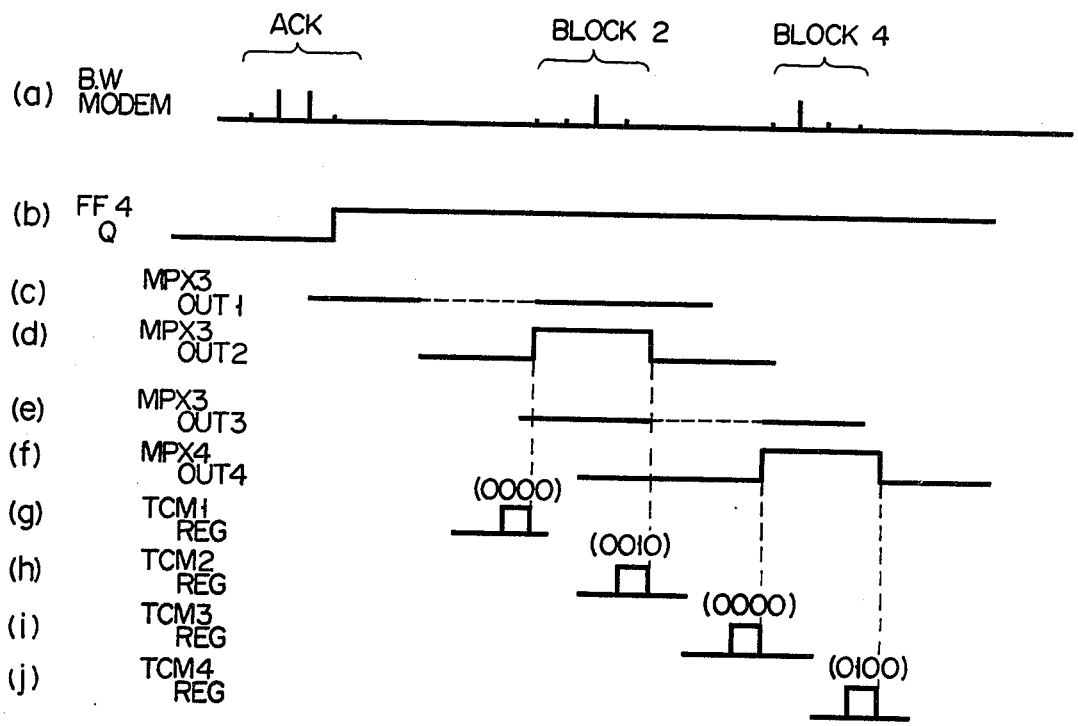
FIG. 8 is a time chart illustrating the operation of the circuit arrangement of FIG. 7.

FIG. 7 shows the detailed circuit arrangement of the backward receiving section $R_r$ of FIG. 1. A control signal (ACK signal or retransmission request signal (NAK) indicated in block number) shown in FIG. 8(a) is demodulated by the backward MODEM18 and supplied to a register 131 through a buffer memory 130. First, the transmission side detects an ACK signal issued from the receiving side to notify the transmission side that the receiving side has detected a data block synchronization code SYN. The code "0110" of the ACK signal is compared with the contents of the register 131 by a comparator 132. If coincidence arises as the result of comparison, then a coincidence pulse is issued. This coincidence pulse is conducted to a flip-flop circuit 133 to set it as shown in FIG. 8(b). When, set, the flip-flop circuit 133 generates an output signal having a logic level of "1" from the set output Q terminal. This output signal is supplied to a register 135 through an AND gate 134. Therefore, a backward data (retransmission request error control signal) delivered from the backward MODEM18 is stored in the register 135.

A flip-flop circuit 136 is set by a block count start pulse shown in FIG. 3. An output signal from the set output terminal Q of the flip-flop circuit 136 is ANDed with a block count pulse (FIG. 3) in an AND circuit 137, an output from which is successively counted by an N block counter 138. This N block counter 138 produces a count output signal, each time said counter 138 counts an N number of data block count pulses. An output signal from the N block counter is converted into a restart signal after passing through an AND circuit 139. This means that where the forward transmission section $T_t$ does not detect an ACK signal (that is, the flip-flop circuit 133 is not reset) while an N number of data blocks are counted after issue of the data block synchronization code SYN, then the forward transmission section $T_t$ generates a restart signal and again supplies the receiving side with the data block synchronization code SYN.

A backward error control signal (the serial block number of a data block) stored in the register 135 is converted from the serial to the parallel form and conducted to a multiplexer (MPX3) 140 and the corresponding one of AND gates 141-144. The multiplexer (MPX3) 140 issues one of the output signals OUT1 and OUT15 having a logic level of "1" only during the time width of a data block represented by said serial block number. Writing of error control signals is registers (TCM1 to TCM15) 148-150 is permitted or prevented according to the output signals OUT1 to OUT15 conducted through the corresponding inverters 145-147. Since the AND gates 141-144 are supplied with a Q output signal from a flip-flop circuit 151, the serial numbers of data blocks read out of the register 135 are stored in the corresponding registers (TCM1 to TCM15) 48-50 (the same type as the registers 48-50 of FIG. 3) through the AND gates 141-144. Since data blocks $D2_e$, $D4_e$ are those for which demand is made for a fresh error-free counterpart to be supplied by the transmitter, the multiplexer (MPX3) 140 generates only outputs OUT2, OUT4 having a logic level of "1" as shown in FIGS. 8(d) and 8(f), and does not send forth, as shown in FIGS. 8(c) and 8(e), output signals OUT1, OUT3 corresponding to the data blocks D1, D3 whose retransmission is not required. As shown in FIGS. 8(g) to 8(j), the registers (TCM1 to TCM15) 148-150 are only stored with the serial numbers of those data blocks for which demand is made to supply a fresh error-free counterpart, but not with the serial numbers of other data blocks which have been transmitted to the receiving side in an error-free state.

As previously mentioned, the transmission side sends forth a clear pulse CLR successively to clear the registers (TCM1 to TCM15) 148-150 already stored with the serial numbers of data blocks, each time one of the data blocks is transmitted from the switch circuit 51 of FIG. 3. In the initial stage where data block synchronization is established, the registers (TCM1 to TCM15) 148-150 are successively stored with the serial numbers of data blocks. When reading is completed, the registers 148-150 are emptied of the contents. Therefore, a backward error control signal (the serial number of a data block) supplied from the receiving side to the register 135 through the backward MODEM18 is written in the corresponding one of the registers 148-150 on the assumption that a data block represented by said serial number can be regarded as correct even without error check.

FIG. 9 shows the detailed circuit arrangement of the separation circuits 16, 20 of FIG. 1. Where both separation circuits 16, 20 are designed for frequency division and a telephone line system is of the simplex type, then forward channel signals and backward channel signals are used with different frequency bands. The separation circuit of FIG. 9 is of the hybrid type and comprises a transformer 150, a balancing network 151 connected to the transformer 150, an amplifier 152 connected to the midpoint top of the primary winding of the transformer 150, and an amplifier 153 connected to the secondary winding of the transformer 150. A forward signal delivered from the forward MODEM15 is conducted to the transmission channel 17 through the amplifier 153 and transformer 150 and then transmitted to the receiving side. On the other hand, a backward signal sent forth from the receiving side through the transmission channel 17 is carried to the transmitter's backward MODEM18 through the transformer 150 and amplifier 152 after the frequency band of said backward signal is distinguished from that of the forward signal.

The signal transmission system of this invention admits of application of not only frequency division but also time division as means for carrying out error control on the backward channel. Where time division is employed, it is necessary to distinguish the exclusive service time of a telephone line system between the forward and backward channels according to the prescribed control formula. FIG. 10 shows the arrangement of a receiver's channel switchover control circuit, which undertakes time division. The error detection circuit 86 of the forward receiving section $R_r$ judges whether a forward data block sent forth from the transmitter has an error, and, where an error is detected, carries a fresh error-free counterpart data block to a register 161 through an AND circuit 160. Where no error is detected, an inverter 162 generates an output signal having a logic level of "1", which is supplied to one of the input terminals of the AND circuit 160. A comparator 163 compares the bit arrangement of the contents of the register 161 with that of the end code of a data block. Where coincidence arises between both bit arrangements as the result of said comparison, then the comparator 163 generates a coincidence output signal, which in turn resets a flip-flop circuit 164. When the end code attached to a forward data block is detected, the flip-flop circuit 164 produces an output signal having a logic level of "1" from the Q terminal. This "1" output signal is conducted to a switch 165, which in turn changes over the transmission channel from the forward to the backward. Where the serial number of a data block currently supplied to the switch 115 is found to be smaller than that of the immediately preceding data block, then the flip-flop circuit 164 is reset, because transmission of an error control signal (a serial block number of a data block) from the receiver to the transmitter can be regarded as already completed. As the result, the flip-flop circuit 164 supplies the switch 165 with an instruction to change over the transmission channel from the backward to the forward.

Comparison between the serial block numbers of data blocks is effected in a comparator 167 by comparing an output signal from the switch 115 which has been conducted through a delay circuit 166 and an output signal directly issued from the switch 115. An output signal from the comparator 167 is conducted to the set side input terminal S of the flip-flop circuit 164 through an AND circuit 168 and delay circuit 169.

It is advised to provide a similar channel switchover control circuit also on the transmission side. Where the transmission side is supplied with an end code from the receiving side through the backward channel, then the transmission channel is changed over from the backward to the forward. Where, in this case, a data block currently received by the transmission side has a smaller serial block number than that received immediately ahead thereof, then it is advised to switchover the transmission channel from the forward to the backward.

The merits and demerits of the frequency division method (FDM) and time division method (TDM) are set forth in Table 1 below.

Table 1

| Item | Frequency Division Method (FDM) | Time Division Method (TDM) |
|---|---|---|
| Transmission speed (b/s) | 50 to 150 | 50 to 9,600 |
| Time length of a data block | For repetition of responses for each data block between the transmitter and receiver, a backward data block should have a smaller time length than a forward data block | No limitation is imposed on the time length of a forward data block |
| Time required for an error control signal to be transmitted from the receiver to the transmitter | Zero under the above-mentioned condition | Time required for one response to be transmitted from the receiver to the transmitter: about $n_B/v + \tau$ where: $v$ = transmission speed through the backward channel $n_B$ = a bit number of an error control signal conducted through the backward channel $\tau$ = time required for changing of the channel |
| Limitation on MODEM (9,600 b/s) | Partial response AM-SSB 8 level AM-VSB | No limitation |
| Interference in the transmission channel | Interference occurs | No interference |
| Establishment of synchronization and equivalence | Easy | The transmission channel has to be switched over by the prescribed control operation |

As seen from Table 1 above, a backward channel designed for time division is generally more advantageous for transmission of data, because no limitation is imposed on the time length of a data block as well as on the MODEM, and moreover no interference takes place in the transmission channel.

There will now be described the operation of the signal transmission system of this invention by reference to the time chart of FIG. 11 illustrating time division. Now let it be assumed that data block synchronization is established between the transmitter and receiver by operation indicated on the time chart of FIG. 2. In the forward transmission section $T_t$, data impressed on a sheet of manuscript is divided into, for example, fifteen data blocks by the data block-forming circuit 12. The respective data blocks are stored in the memory units of the memory circuit 13 which correspond to the serial numbers of said data blocks. The data blocks stored in the memory circuit 13 are successively read out. An error detection check code (CRCC) is attached to each data block by the check code-attaching circuit 14. A fully assembled data block signal formed of the data block, serial number thereof and check code (CRCC) is modulated by the transmitter's forward MODEM15 and sent forth, as shown in FIG. 11(a), to the receiving section $R_r$ of the receiving side through the separation circuit 16 and transmission channel 17. The modulated data block is delivered to the receiver's forward MODEM21 to be demodulated. A data block signal delivered from the forward MODEM21 is conducted to the error detection circuit 22, which judges whether the data block received has an error. An error-free data block is stored in the memory circuit 23. Erroneous data blocks, for example, D2, D4 are not stored in the memory circuit 23. At this time, the error control signal generator 25 is operated to issue the serial number of an erroneous data block for which demand is made for a fresh error-free counterpart to be supplied by the transmitter. The serial number of an erroneous data block is an error control signal shown in FIG. 11(c). After modulated by the receiver's backward MODEM26, the serial number of the erroneous data block is sent forth to the transmission side through the separation circuit 20 and backward channel. The error control signals, for example, NAK2, NAK4 supplied to the backward receiving section $T_r$, as shown in FIG. 11(d), are demodulated by the transmitter's backward MODEM18. The error control signals NAK2, NAK4 thus demodulated are conducted to the error control circuit 19. This error control circuit 19 specifies the memory units already stored with the erroneous data blocks $D2_e$, $D4_e$. After transmission of the other error-free data blocks to the receiver is completed, the erroneous data blocks $D2_e$, $D4_e$ are read out of the memory circuit 13. The erroneous data blocks $D2_e$, $D4_e$ to which a check code has now been attached are transmitted to the receiving side. If, in this case, an error control signal, for example, NAK2 becomes erroneous, as shown in FIG. 11(c), during transit through the backward channel, then the forward transmission section $R_t$ supplies the receiver with a fresh error-free data block D4 corresponding to the error control signal NAK4 received by the transmitter in an error-free state, as shown in FIG. 11(e). Thereafter, the backward transmission section $R_t$ again sends forth, as shown in FIG. 11(h), the error control signal NAK2 to the backward receiving section $T_r$ at the end of the prescribed period of time as a demand for the transmitter again to supply the receiver with a fresh error-free data block corresponding to said NAK2 signal. As the result, the forward transmission section $T_t$ supplies the forward receiving section $R_r$, as shown in FIG. 11(i), with a fresh error-free data block D2 whose supply was previously demanded by the receiver.

Where all fifteen data blocks are conducted to the receiver in an error-free state, then data impressed on a sheet of manuscript is delivered from the memory circuit to the terminal display device 14.

There will now be described the process of determining the efficiency $\eta$ of data transmission carried out by the signal transmission system according the foregoing embodiment of this invention. Reference is made to the case where determination is made of the efficiency $\eta$ of data transmission undertaken by the time division method illustrated by the time chart of FIG. 11.

Now let it be assumed that with respect to the forward channel, N denotes the bit length of each data block; V b/s the data transmission speed; $P_{eF}$ the bit error rate; $P_{bF}$ the data block error rate; $\tau_F$ sec the set up time; and M the number of data blocks being transmitted. Also let it be assumed that with respect to the backward channel, M bit shows the bit length of a data block; $v$ b/s the data transmission speed; $P_{eB}$ the bit error rate; $P_{bB}$ the data block error rate; $\tau_B$ sec the set up time; and $\tau_{c/2}$ sec the delay time on the transmission line. Further, since M indicates the number of data blocks, the bit number of an error control signal is taken to be represented by $M_F$.

A data block in which an error occurs during transit through the backward channel may be expressed as follows. Where a transmission error arises when any of the "0" bits included in those which constitute a data block is changed to a "1" bit, then the resultant erroneous data block may be expressed as:

$$M(1 - P_{bF}) \cdot \frac{P_{eB}}{2}$$

where a transmission error takes place due to any of the "1" bits included in those constituting a data block being changed to a "0" bit, then the resultant erroneous data block may be expressed as:

$$M \cdot P_{bF} \cdot \frac{P_{eB}}{2}$$

Therefore a number of fresh error-free data blocks corresponding to the previously transmitted erroneous data blocks which should be supplied anew to the receiver may be expressed as:

$$M(1 - P_{bF}) \cdot \frac{P_{eB}}{2} + M \cdot P_{bF}(1 - \frac{P_{eB}}{2}) = M \cdot P$$

where P is taken to have the following value in the case of a random error $$P = P_{bF} + P_{eB}(\tfrac{1}{2} - P_{bF}) \simeq P_{bF}$$

Therefore, a total length of time required for an M number of data blocks to be all transmitted in an error-free state is expressed as $$T = \frac{M \cdot N}{V} + \frac{M \cdot N}{V} P_{bF} + \frac{M \cdot N}{V} P_{bF}^2 + \ldots$$

$$T_E + T_E \cdot P_{bF} + T_E \cdot P_{bF}^2 + \ldots$$

$$= (\frac{M \cdot N}{V} + T_E) \frac{1}{1 - P_{bF}}$$

where $T'_E = (M/v) + \tau$ ($\tau$ is taken to be equal to $\tau_c + \tau_F + \tau_B$). Thus, the transmission efficiency $\eta$ corresponding to the above-mentioned case may be indicated as:

$$\eta = \frac{1 - P_{bF}}{1 + \frac{T_E \cdot V}{M \cdot N}}$$

Figure 12:
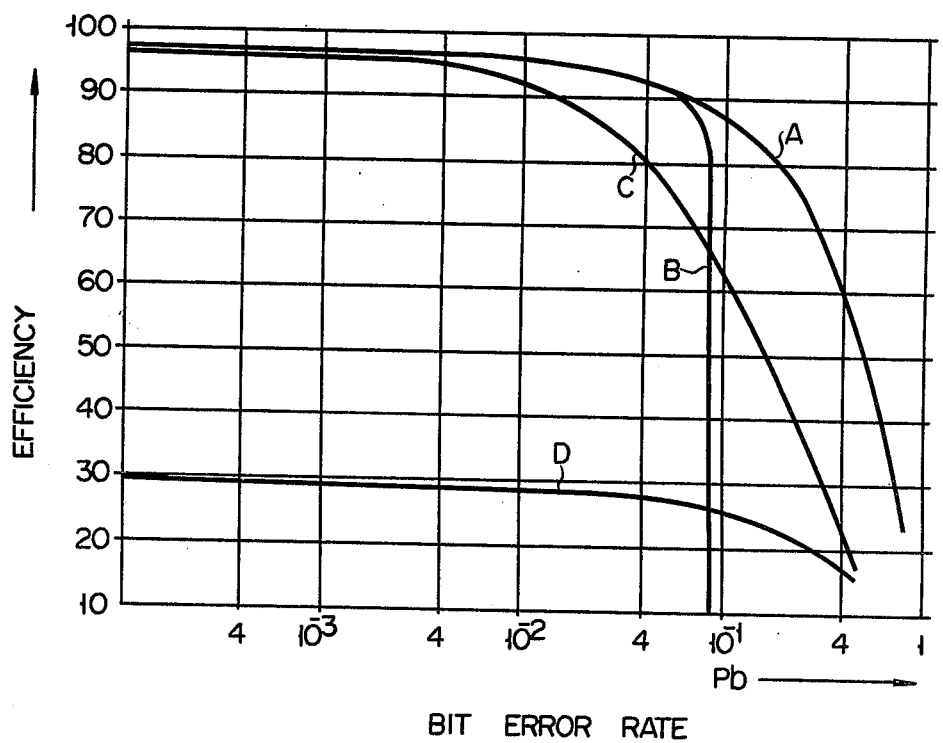
FIG. 12 is a curve diagram indicating the signal transmission efficiency of the signal transmission system of this invention.

Referring to a curve diagram of data transmission efficiency shown in FIG. 12, the curve A denotes the data transmission efficiency of a signal transmission system embodying this invention; the curve B the data transmission efficiency of the conventional "Selective Repeat ARQ" type signal transmission system; the curve C the data transmission efficiency of the conventional "Continuous ARQ" type signal transmission system; and the curve D the data transmission efficiency of the conventional "Stop-and-Wait ARQ" type signal transmission system. Where the bit error rate $P_b$ rises above $8 \times 10^{-2}$, then the conventional "Selective Repeat ARQ" type signal transmission system sharply falls in data transmission efficiency. The reason is that an error control signal has to be repeatedly transmitted, using a ENQ signal. In contrast, with the signal transmission system of this invention in which a check code is not attached to an error control signal, high data transmission efficiency can be maintained, as seen from the curve A, even when the bit error rate increases over $8 \times 10^{-2}$. Therefore, the present signal transmission system which can efficiently transmit a large amount of data through a telephone line is most adapted for use as a still picture data transmission device.

With the foregoing embodiment, the serial number of an erroneous data block is indicated in the form of parallel arranged bits. An error control signal conducted from the receiver to the transmitter through the backward channel is only formed of the bits representing the serial number of an erroneous data block. Where an M number of data blocks (representing, for example, data impressed on a single sheet of manuscript) is taken to constitute one pattern then the present invention further causes an error control signal to be issued in the form in which one bit is allotted to each of the M number of data blocks, that is, in the form of an M bit pattern, thereby making it possible to carry out the transmission of a pattern error control signal (in this case, an erroneous data block is denoted by a "1" bit).

There will now be described by reference to FIG. 13 the transmission of a pattern error control signal through the backward channel. Reference is made to the case where the forward transmission section $T_t$ transmits, for example, fifteen data blocks to the forward receiving section $R_r$ through the forward channel. If data blocks $D2_e$, $D4_e$ are found erroneous as shown in FIG. 13(a), then the backward transmission section $R_t$ supplies the backward receiving section $T_r$ with a 15-bit pattern error control signal with one bit allotted to one data block in which the erroneous data blocks $D2_e$, $D4_e$ are respectively indicated by a bit having a logic level of "1" shown in FIG. 13(b). In this case, the third bit of the pattern control signal is turned erroneous during transit through the backward channel as shown in FIG. 13(c). However, the backward receiving section $T_r$ (FIG. 13(c)) does not detect said error, but takes the third bit just as supplied. The backward receiving section $T_r$ (FIG. 13(e)) again transmits erroneous data blocks $D2_e$, $D3_e$, $D4_e$ (of which the data block $D3_e$ is regarded as erroneous) to the forward receiving section $R_r$ (FIG. 13(f)). If the data block $D2_e$ is again turned erroneous during transit thereto, then the backward receiving section $R_r$ (FIG. 13(h)) delivers the second bit corresponding to said erroneous data block $D2_e$ to the backward transmission section $T_t$ (FIG. 13(g)) with the logic level of said second bit changed to "1". Then the forward transmission section $T_t$ (FIG. 13(i)) sends forth a fresh error-free data block corresponding to the erroneous data block $D2_e$ included in the pattern error control signal.

To effect the transmission of the pattern error control signal, the registers (TCM1 to TCM15) and registers (RCM1 to RCM15) of FIGS. 3, 5 and 7 should initially be stored with a pattern error control signal, all the bits of which have a logic level of "1" or "0". In this case, therefore, each memory unit of said registers (TCM1 to TCM15) and registers (RCM1 to RCM15) should be stored with one bit. To this end, it is advised to modify each circuit of the backward transmission and receiving sections so as to handle the serial block number of a data block which as now formed of one bit instead of four bits of the previous case.

Figure 14:
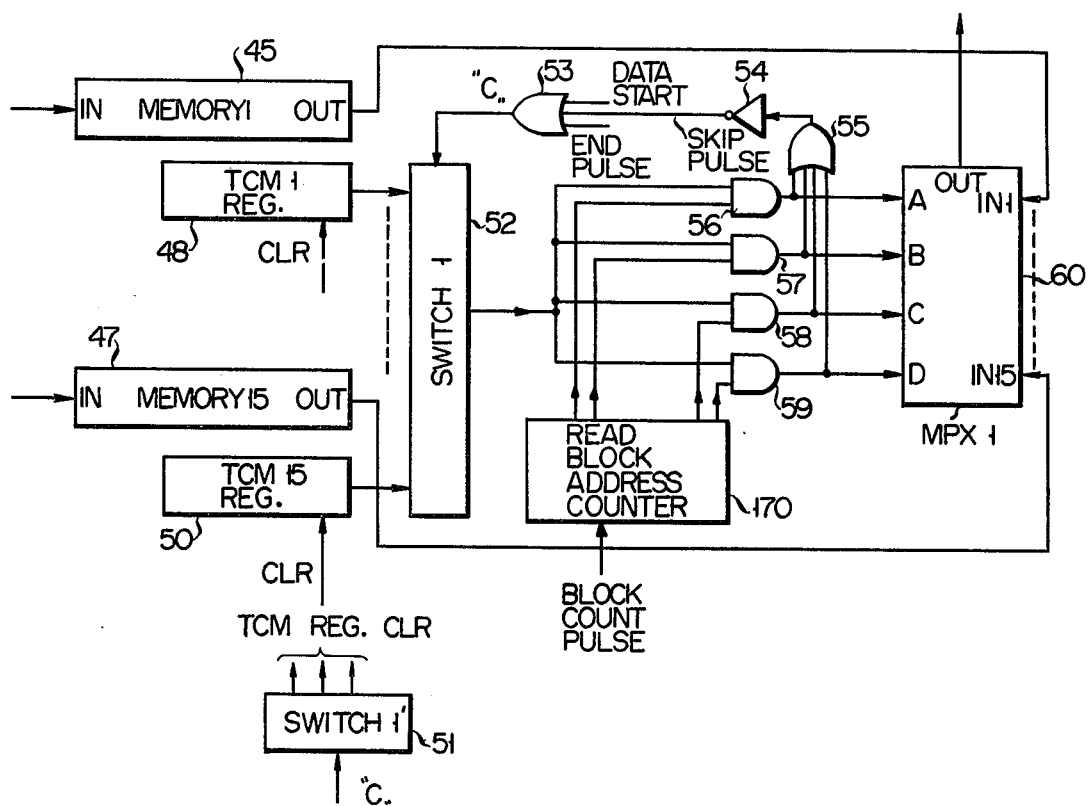
FIG. 14 shows the arrangement of that circuit included in the forward transmission section $T_r$ of FIG. 3 which has been modified for transmission of the pattern control signal undertaken by a signal transmission system according to said another embodiment.

FIG. 14 shows the arrangement of the transmitter's circuit designed for transmission of a pattern error control signal. The registers (TCM1 to TCM15) 48-50 are formed of 1-bit memory units. The bits stored in the 1-bit memory units of these registers (TCM1 to TCM15) 48-50 are initially chosen to have a logic level of "1". The contents of said registers are successively cleared by a clear signal CLR, each time one data block is read out. In this case, if becomes necessary again to produce a data block number formed of, for example, parallel arranged four bits. To this end, the signal transmission system of this invention further comprises a read block address counter 170 operated by a block count pulse. A bit code representing the serial number of a data block delivered from the read block address counter 170 is supplied to the corresponding one of the AND circuits 56-59. The gating of said bit code is controlled according to the logic level of an output signal from the switch 52. Namely, where one bit having a logic level of "0" is stored in all the registers (TCM1 to TCM15) (that is, in the case where no error occurs in the data blocks during transmission), then the inverter 54 generates a skip pulse, which in turn passes through the OR circuit 53 to be converted into a signal "C". This signal "C" operates the switch 52 ready for transmission of the succeeding data. If a bit stored in any of the registers (TCM1 to TCM15) has a logic level of "1" (denoting the presence of an error), then a data block number code issued from the read block address counter 170 (denoting a data block number to be supplied to the transmission side) is conducted to a multiplexer (MPX1) 60 through the corresponding one of the AND circuits 56-59. As the result, a data block number being sent forth to the transmission side is read out of the corresponding one of the memories (MEMORY1 to MEMORY15) and conducted to the multiplexer (MPX1) 60, which in turn issues said data block number. The other circuits of FIG. 14 and the operation thereof are the same as in FIG. 2, the description thereof being omitted.

FIG. 15 shows the arrangement of the receiver's circuit designed for transmission of a pattern error control signal. A data block number stored in the register 84 is read out to a multiplexer (MPX2) 85, which generates an output corresponding to the data block number for a length of time corresponding to a data block. Outputs OUT1 to OUT15 from the multiplexer (MPX2) 85 are sent forth to the enable terminals of the registers (RCM1 to RCM15) 99-101 through the corresponding inverters 102-104 and a delay circuit 105.

An error check code detection circuit 86 judges whether a data block received has an error. If the data block is found erroneous, then a bit having a logic level of "1" is stored in that of the registers (RCM1 to RCM15) which corresponds to the serial number of said erroneous data block. When the registers (RCM1 to RCM15) are cleared of the contents, the bits constituting a backward pattern error control signal are successively sent forth from the receiving side to the transmission side through a switch (SWITCH2) 115. The bits stored in the registers (RCM1 to RCM15) 99–101 are all initially chosen to have a logic level of "0". The other circuits of FIG. 14 are the same as those of FIG. 5, the description thereof being omitted.

Figure 16:
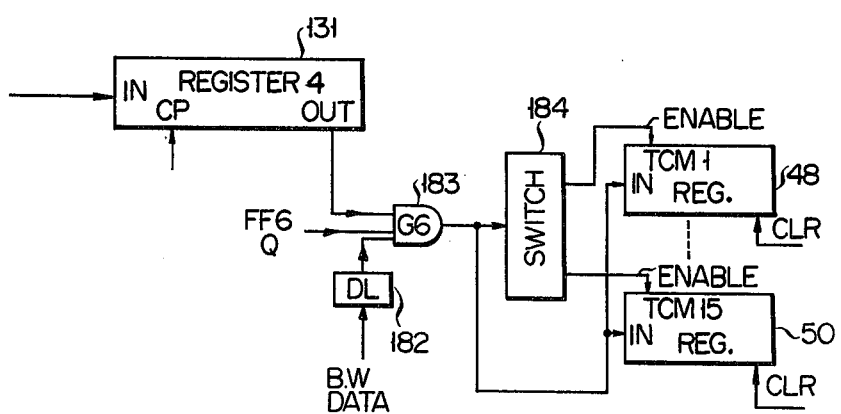
FIG. 16 indicates the arrangement of that circuit included in the backward receiving section $T_r$ of FIG. 7 which has been modified for transmission of the pattern control signal performed by said another embodiment.

FIG. 16 presents the circuit arrangement of the backward receiving section $T_r$ designed for transmission of a pattern error control signal. A backward data BW DATA (in this case, a pattern error control signal) is conducted to an AND gate 183 through a delay circuit 182. As in the circuit of FIG. 7, this AND gate 183 is supplied with an output from a register 131 and an output from the set side output terminal Q of a flip-flop circuit 148. When an output from the AND gate 183 is supplied to a switch 184, then an output from said switch 184 renders the registers (TCM1 to TCM15) 48–50 ready to be stored with data. At this time the bits constituting the backward data BW DATA are stored in parallel in the register (TCM1 to TCM15) 48–50.

In this case, the bits stored in the registers (TCM1 to TCM15) 48–50 are initially all chosen to have a logic level of "1" on the assumption that all the data block have an error. Each time a data block is read out, the corresponding one of the data block number registers (TCM1 to TCM15) 48–50 is cleared of the contents. The other circuits of FIG. 16 and operations thereof are the same as in FIG. 9, description thereof being omitted.

Transmission of a pattern error control signal enables a still picture display of data impressed on a single sheet of manuscript to be effected easily in an error free state.

It will be noted that this invention is not limited to the foregoing embodiment. An error control signal conducted through the backward channel may be formed of a format signal capable of detecting an error.

What is claimed as new and desired to be secured by Letters Patent of the United States is:

1. A signal transmission system using a selective automatic repeat request system which comprises a transmission section including first memory means for storing data being transmitted in the form having the prescribed block length measured by a number of bits, control means for selecting a data block having the prescribed serial number from among those which are stored in the memory means, and means connected to the output of the control means for attaching the prescribed check code to the selected data block and for transmitting the code attached data block to a communication channel; and a receiving section including receiving means for receiving a data block sent forth from the transmission section through the communication channel, detection means for detecting an error in a data block received by the receiving means, second memory means connected to the output of the detection means for successively storing only error-free correct data blocks included in the received data blocks, and means which generates an error control signal including a negative acknowledgement information when an erroneous data block is detected by the detection means and which generates no control signal when no erroneous data block is detected by the detection means, said error control signal indicating a demand for retransmission of a new error-free data block corresponding to the previously transmitted data block whose error has been detected by the detection means and said error control signal being transmitted through the communication channel to the control means in the transmission section so that the control means selects the data block corresponding to the error control signal, and wherein the transmission section retransmits a new error-free data block corresponding to an error control signal received from the receiving section, without checking whether the control signal thus received is erroneous or not.

2. The signal transmission system according to claim 1, wherein the error control signal denotes a data block serial number which is formed of the prescribed number of bits and does not contain an error correction check bit.

3. The signal transmission system according to claim 1, which further comprises separation means provided in the communication channel for distinguishing between a data block delivered from the transmission section to the receiving section and an error control signal issued from the receiving section to the transmission section.

4. The signal transmission system according to claim 3, wherein the separation means includes a hybrid type frequency band separator for distinguishing between a data block supplied from the transmission section to the receiving section and an error control signal sent forth from the receiving section to the transmission section, both having different frequency bands.

5. The signal transmission system according to claim 3, wherein the separation means includes a time sharing circuit designed to change over the operation of the communication channel when a data block is delivered from the transmission section to the receiving section or an error control signal is issued from the receiving section to the transmission section, said operation being continued for a length of time required for transmission of either.

6. The signal transmission system according to claim 3, wherein the error control signal denotes the prescribed serial number of a data block and does not contain an error correction check bit.

7. A signal transmission system using a selective automatic repeat request system which comprises a transmission section including first memory means for storing data being transmitted in the form having the prescribed block length measured by a number of bits, control means for selecting a data block having the prescribed serial number from among those which are stored in the memory means connected to the output of the control means, and means for attaching the prescribed check code to the selected data block and for transmitting the code attached data block to a communication channel; and a receiving section including means for receiving a data block delivered from the transmission section through the communication channel, error detection means for judging whether a data block supplied to the receiving section has an error, second memory means connected to the output of the detection means for successively storing only error-free correct data blocks included in those which are conducted to the receiving section, and means which distinguishes between an erroneous data block detected by the detection means and an error-free data block and which generates an error control signal including a negative acknowledgement information when an erroneous data block is detected and no control signal when no erroneous data block is detected, said error control signal indicating a demand for the transmission section to supply the receiving section with a new error-free data block corresponding to said erroneous data block and said error control signal being transmitted through the communication channel to the control means in the transmission section so that the control means selects the data block corresponding to the erroneous data block; and wherein the transmission section retransmits to the receiving section with an error-free data block corresponding to an erroneous data block represented by the prescribed logic level of a bit included in the error control signal.

8. The signal transmission system according to claim 7, wherein the error control signal is formed of a plurality of bits, each of which corresponds to one data block and does not contain an error correction check bit.

9. The signal transmission system according to claim 7, wherein the pattern error control signal-generating means includes a multiplexer circuit having data block receiving terminals and retransmission demand signal receiving terminals for producing one output signal for each data block received; 1 bit memories provided in the same number as the data blocks and further designed to store a bit having the prescribed logic level to denote an erroneous one of the respective data blocks; and a switching circuit connected between the output of 1-bit memories and the retransmission demand signal receiving terminals of the multiplexer for converting all outputs from said 1 bit memories into a pattern whose serially arranged bits represent the respective data blocks.

* * * * *